United States Patent [19]

McClean

[11] Patent Number: 5,551,335

[45] Date of Patent: Sep. 3, 1996

[54] CITRUS JUICER

[75] Inventor: Stephen J. McClean, Beverly Hills, Australia

[73] Assignee: Breville R & D Pty Ltd., Pyrmont, Australia

[21] Appl. No.: 217,688

[22] Filed: Mar. 25, 1994

[30] Foreign Application Priority Data

Apr. 29, 1993 [AU] Australia .................................. PL8559

[51] Int. Cl.⁶ ...................................................... A23N 1/00
[52] U.S. Cl. .................................. 99/504; 99/501; 99/508
[58] Field of Search .............................. 99/495, 501–508; 100/98 R, 208, 213

[56]  References Cited

U.S. PATENT DOCUMENTS

| | | | |
|---|---|---|---|
| 1,661,374 | 3/1928 | Lacey | 99/507 |
| 1,888,528 | 11/1932 | Faulds | 99/504 |
| 1,966,978 | 7/1934 | Estrada et al. | 99/504 |
| 2,008,899 | 7/1935 | Daum | 99/507 |
| 2,017,960 | 10/1935 | Faulds . | |
| 2,081,424 | 5/1937 | Daum | 99/507 |
| 2,160,388 | 5/1939 | Morse | 99/503 |
| 2,517,519 | 8/1950 | Wurgaft | 99/504 |
| 2,629,317 | 2/1953 | Nelson | 100/208 |
| 4,951,563 | 8/1990 | Warren et al. | 100/213 |
| 4,961,374 | 10/1990 | Lee | 100/98 R |
| 5,035,174 | 7/1991 | Seal, Jr. | 100/98 R |

FOREIGN PATENT DOCUMENTS 37983  4/1936  Netherlands ............................ 99/504

*Primary Examiner*—Timothy F. Simone
*Attorney, Agent, or Firm*—Michael J. Striker

[57]  ABSTRACT

A citrus juicer having a base enclosing a driving electric motor arranged to drive a pair of upstanding spindles on top of each of which is a juicing cone, the juicing cones being arranged above a container for the collection of juice, characterised in that the container is attached to the base so as to be readily removable therefrom for cleaning, a lid arranged to extend over the juicing cones and the container hingedly removably attached to the container, the lid being shaped internally to apply pressure to a half-citrus fruit placed on top of each said juicing cone on closure of the lid, the lid being moulded from plastic in a single piece, the arrangement being such that half of a citrus fruit can be placed on top of each juicing cone and the lid hinged downwardly to press simultaneously the halve of the citrus fruit onto the juicing cones in order to cause juice to be extracted from them.

5 Claims, 3 Drawing Sheets

CITRUS JUICER

BACKGROUND OF THE INVENTION

The present invention relates to citrus juicers, that is to say to apparatus for extracting the juice from citrus fruit such as oranges.

In the specification of U.S. Pat. No. 2,017,960 is described a citrus juicer consisting of a base enclosing a driving electric motor arranged to drive a pair of upstanding spindles at the top of each of which is a juicing cone, each juicing cone being arranged above a container for the collection of juice, a receptacle arranged for the reception of a whole citrus fruit such as an orange adjacent the juicing cones, two inverted cup shaped members arranged one above each juicing cone, the cup shaped members being supported for vertical movement and a lever being provided whereby the cup shape members may be brought downwardly to press a half citrus fruit against each juicing cone, a knife being movable with the cup shaped members on movement of the lever being arranged so that as the cup shape members are brought down onto halves of fruit on the juicing cones the knife is brought down to cut in half the fruit in the receptacle. The apparatus described in that specification would be extremely expensive to manufacture and presents problems in cleaning the machine after use.

The patent concerned issued in 1935 but so far as can be ascertained the apparatus described is not available in the market.

SUMMARY OF THE INVENTION

The present applicant has recognised the merits of the construction described above and has devised advantageous improvements which are the subject of the present application.

The principal object of the present invention is to provide a citrus juicer of a similar kind in which the shortcomings referred to above are overcome. The invention provides a citrus juicer that is relatively inexpensive to make and in which those parts that come into contact with citrus juice are readily removable for cleaning.

The present invention consists in a citrus juicer comprising a base enclosing a driving electric motor arranged to drive a pair of upstanding spindles on top of each of which is a juicing cone, the juicing cones being arranged above a container for the collection of juice, characterised in that the container is attached to the base so as to be readily removable therefrom for cleaning, a lid arranged to extend over the juicing cones and the container and being hingedly removably attached to the container, the lid having internal means arranged to apply pressure to a half-citrus fruit placed on top of each said juicing cone on closure of the lid, the last mentioned means and the lid being moulded from plastic in a single piece, the arrangement being such that half of a citrus fruit can be placed on top of each juicing cone and the lid hinged downwardly to press simultaneously the halve of the citrus fruit onto the juicing cones in order to cause juice to be extracted from them.

In a preferred form the present invention consists in a citrus juicer comprising a base enclosing a driving electric motor arranged to drive a pair of upstanding spindles on top of each of which is a juicing cone, the juicing cones being arranged above a container for the collection of juice, there being formed integrally with the said container an open cavity for receiving a single whole citrus fruit, characterised in that the container is attached to the base so as to be readily removable therefrom for cleaning, a lid arranged to extend over the juicing cones, the cavity and the container and being hingedly removably attached to the container, the lid having extending downwardly into the open cavity a cutting blade and having internal means arranged to apply pressure to a half-citrus fruit placed on top of each said juicing cone on closure of the lid, the blade, the last mentioned means and the lid being moulded from plastic in a single piece, the arrangement being such that a citrus fruit may be placed in the cavity and a half of a citrus fruit placed on top of each juicing cone and the lid hinged downwardly to press simultaneously the halves of the citrus fruit onto the juicing cones in order to cause juice to be extracted from them and by means of the cutting blade to cut the fruit in the cavity into two pieces.

In order that the nature of the invention may be better understood a preferred form thereof is hereinafter described by way of example with reference to the accompanying drawings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
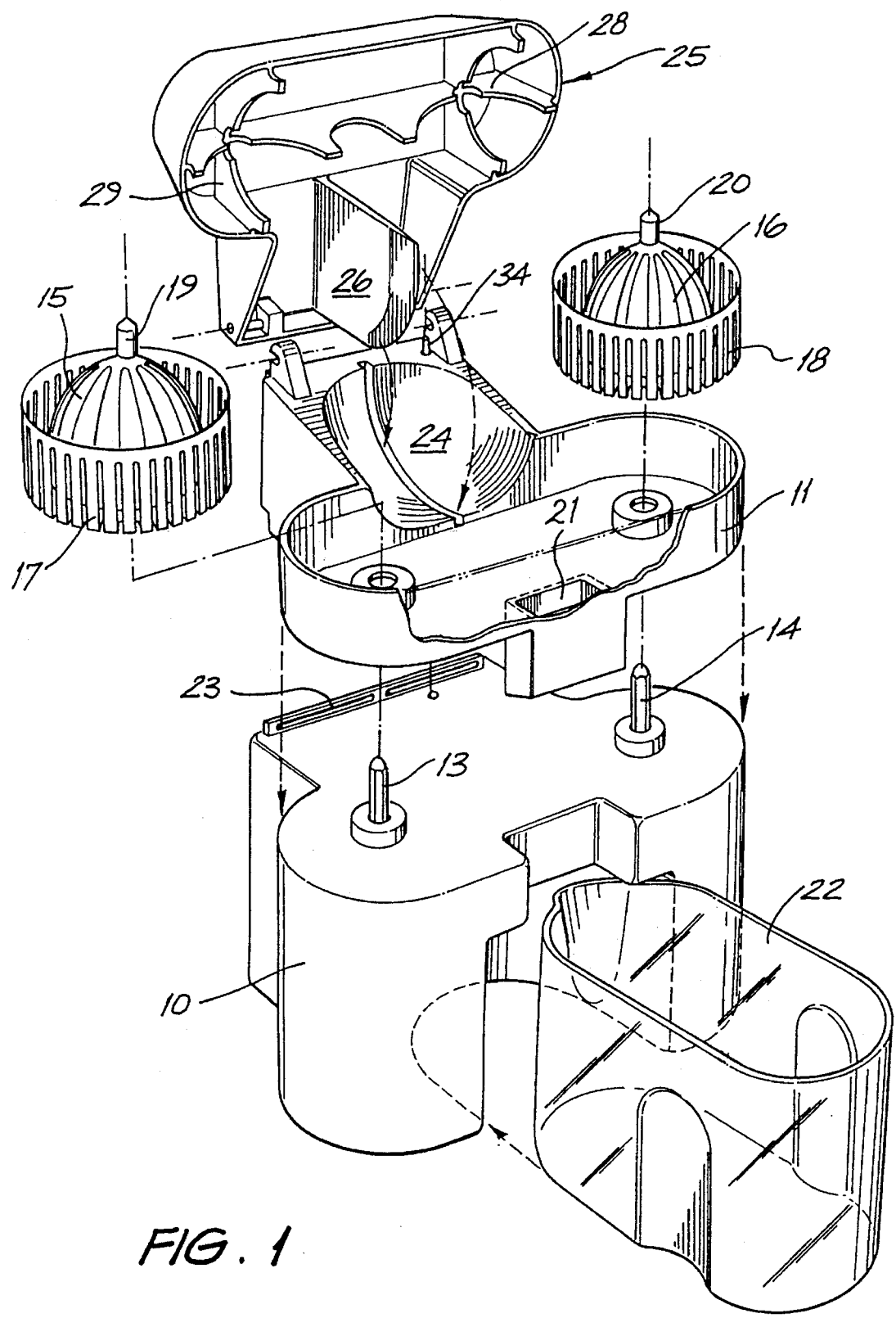
FIG. 1 is a perspective exploded view of a citrus juicer according to the invention.
Figure 2:
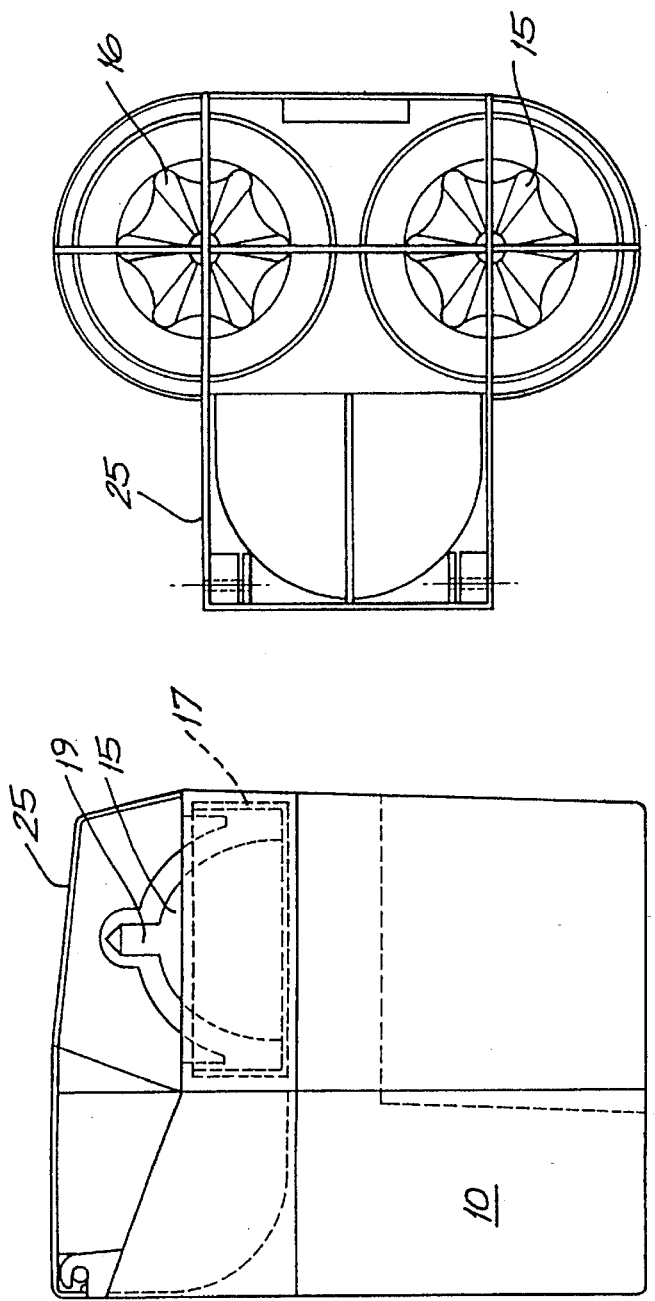
FIG. 2 is a side elevation thereof.
Figure 3:
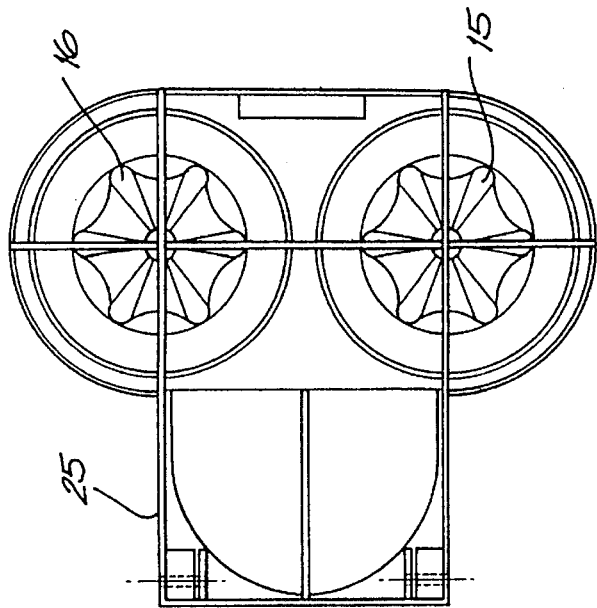
FIG. 3 is a plan view thereof.
Figure 4:
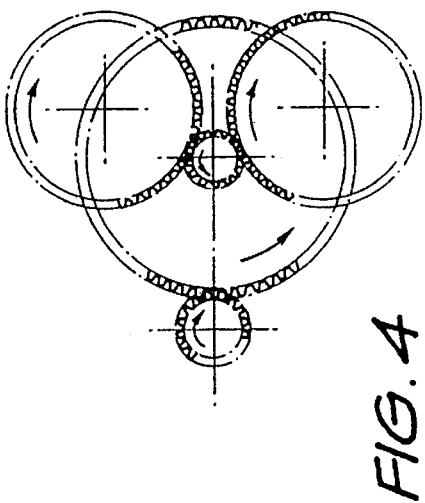
FIG. 4 illustrates the train of gears through which the juicing cones are rotated.
Figure 5:
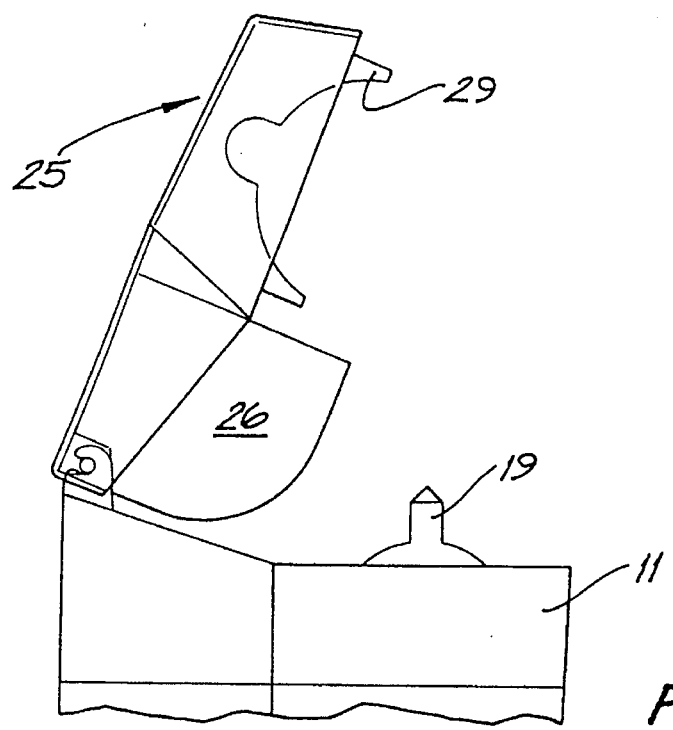
FIG. 5 is an elevation of the upper portion of the container with the lid in the open position.
Figure 6:
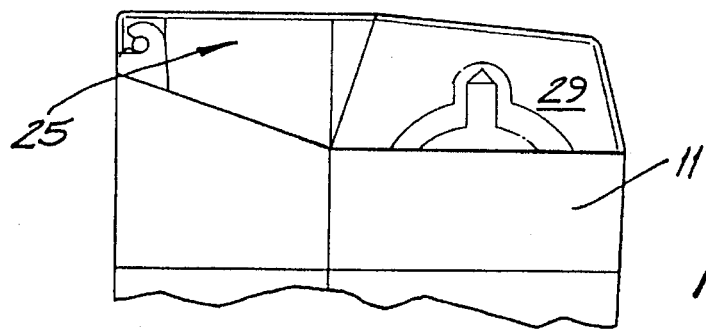
FIG. 6 is a similar view with the lid in the closed position.

The citrus juicer consists of a casing 10 that encloses at its rear a driving motor. The motor acts through gearing shown in FIG. 4 contained in the base of the container 10 to drive vertical spindles 13 and 14 on which are juicer cones 15 and 16 respectively. The juicer cones 15 and 16 are formed integrally with annular perforated strainer members which act to prevent pips and coarse material entering the container 17 and 18 and are provided at their apices with nipples 19 and 20 the purpose of which is explained below.

Resting on the casing 10 is a container 11 for reception of citrus juice flowing from the strainer members 17 and 18. The container is provided with an outlet 21 through which juice flows into the removable receptacle 22. The casing 11 is connected removably to the casing 10 through the hinge connection 23 so that the container 11 may be readily removed from the casing 10 for cleaning.

The casing 10 is also provided with a cavity 24 for the reception of a whole citrus fruit.

To the container 11 is hingedly and removably attached a lid 25 made by moulding from plastic material. On the underside of the lid is a blade 26 the purpose of which is described below and structures 28 and 29 each consisting of four internally arcuately shaped members adapted to fit around the surface of a half of a citrus fruit impaled on nipples 19 or 20.

The lid 25, the blade 26 and the structures 28 and 29 are all moulded integrally from plastic material, the blade 26 being provided with a sharp cutting edge. The connection between the lid and the casing is such that the lid may be readily removed for cleaning.

Figures 7, 8, 9:
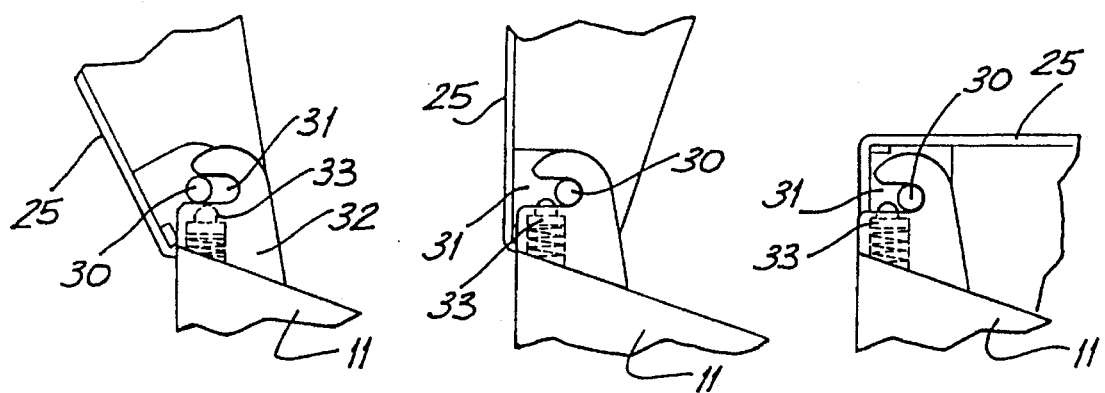
FIGS. 7, 8 and 9 show details of the hinged connection between the lid and the container.

The structure of the connection is shown in FIGS. 5 to 9 and in particular in FIGS. 7, 8 and 9 which show to an enlarged scale the structure and from these it will be seen that pins 30 on the lid enter slots 31 on upstanding lugs 32 of the container 11. Once the pins 30 have fully entered the slots they are retained in that position by spring loaded detents 33. The spring pressure, however, is such that the pins 30 can readily be removed from the slots 31 to permit the lid to be removed from the container.

As a matter of safety a pin 34 is provided which is depressed as the lid is closed and operates a switch controlling the motor, the arrangement being such that the juicing cones cannot be caused to rotate until the lid is at least partially closed.

In use the lid 25 is raised and a whole citrus fruit placed in the cavity 24. Another citrus fruit is cut in half in the usual manner and each half is impaled on one of the nipples 19 and 20. The lid is then lowered and pressure applied to the two halves of the citrus fruit on the rotating juicing cones 15 and 16. This causes juice to be extracted from them in the usual manner. Juice from the juicing cones flows through the filter members 17 and 18 and into the removable clear juice container 11 and thence into the receptacle 22. As the lid is being pressed down the cutting blade 26 acts to cut the citrus fruit in the cavity in half, the edge of the blade passing into the slot 34. At the completion of the operation the lid is raised, the two halves of the citrus fruit from which juice has been extracted are discarded and the two halves now resting in the cavity 21 are placed on the nipples 19 and 20 of the juicing cones and a fresh fruit is placed in the cavity 24. The whole cycle of operations is repeated as often as necessary.

The embodiment of the invention described above is given by way of example of a preferred form of the invention defined in the succeeding claims.

I claim:

1. A citrus juicer, comprising a base; an electric motor accommodated in said base; a pair of upstanding spindles driven by said electric motor and each having a top provided with a juicing cone; a container for collecting juice and arranged so that said juicing cones are located above said container, said container being attached to said base so as to be readily movable from said base for cleaning; a lid arranged to extend over said juicing cones in said container and being hingedly removably attached to said container, said lid being provided with internal means arranged to apply pressure to a half-citrus fruit placed on top of each of said juicing cones after closure of said lid, said means and said lid being formed as a single piece element composed of plastic and arranged so that when a citrus fruit is placed on top of each said juicing cones and said lid is hinged downwardly said means press simultaneously the halves of the citrus fruit onto said juicing cones in order to cause the juice to be extracted from the citrus fruit.

2. A citrus juicer as defined in claim 1, wherein said container is provided with an integral open cavity for receiving a single citrus fruit, said lid having a cutting blade which when said lid is closed, extends downwardly into said open cavity, said blade-being arranged so that a fruit in said cavity is cut in half after closure of said lid.

3. A citrus juicer as defined in claim 1, and further comprising switch means for controlling operation of said electric motor; and displaceable means arranged to control operation of said switch, said displaceable means being arranged in relation to said lid in such a manner that said switch is switched to an on-position only when said lid is at least partially closed.

4. A citrus juicer as defined in claim 1, wherein said internal means arranged to apply pressure to a half citrus fruit each include four internally arcuately shaped members adapted to fit around a surface of a half of a citrus fruit impaled on each of said juicing cones.

5. A citrus juicer as defined in claim 1, and further comprising an annular perforated member surrounding each of said juicing cones and acting to prevent an entry of coarse material and pips into said container.

* * * * *